United States Patent
Karner (10) Patent No.: US 8,710,372 B2
(45) Date of Patent: Apr. 29, 2014

(54) DEVICE TO FACILITATE MOVING AN ELECTRICAL CABLE OF AN ELECTRIC VEHICLE CHARGING STATION AND METHOD OF PROVIDING THE SAME

(75) Inventor: Donald B. Karner, Phoenix, AZ (US)

(73) Assignee: Blink Acquisition, LLC, Miami Beach, FL (US)

( * ) Notice: Subject to any disclaimer, the term of this patent is extended or adjusted under 35 U.S.C. 154(b) by 135 days.

(21) Appl. No.: 13/442,684

(22) Filed: Apr. 9, 2012

(65) Prior Publication Data

US 2012/0193929 A1    Aug. 2, 2012

Related U.S. Application Data

(63) Continuation of application No. PCT/US2012/030000, filed on Mar. 12, 2012, and a continuation-in-part of application No. PCT/US2011/037587, filed on May 23, 2011, which is a continuation-in-part of application No. PCT/US2011/034667, filed on Apr. 29, 2011.

(60) Provisional application No. 61/489,187, filed on May 23, 2011, provisional application No. 61/367,316, filed on Jul. 23, 2010, provisional application No. 61/367,321, filed on Jul. 23, 2010, provisional application No. 61/367,337, filed on Jul. 23, 2010, provisional application No. 61/367,317, filed on Jul. 23, 2010, provisional application No. 61/367,337, filed on Jul. 23, 2010.

(51) Int. Cl.
*B66F 19/00* (2006.01)

(52) U.S. Cl.
USPC .............................. 174/135; 174/136; 174/46

(58) Field of Classification Search
USPC .......... 174/135–136, 111, 46; 248/76, 79, 51; 16/431, 428, 430, 422, 421, 443, 444; 294/174, 25, 132, 133
See application file for complete search history.

(56) References Cited

U.S. PATENT DOCUMENTS

| 4,532,418 | A | 7/1985 | Meese et al. |
| 5,057,762 | A | 10/1991 | Goedken et al. |
| 5,202,617 | A | 4/1993 | Nor |
| 5,327,066 | A | 7/1994 | Smith |
| 5,341,083 | A | 8/1994 | Klontz et al. |
| 5,536,173 | A * | 7/1996 | Fujitani et al. ................. 439/34 |

(Continued)

FOREIGN PATENT DOCUMENTS

| EP | 0533317 A2 | 3/1993 |
| EP | 1458039 A2 | 9/2004 |

(Continued)

OTHER PUBLICATIONS

International Search Report and Written Opinion for corresponding Int'l Application No. PCT/US2011/037590 dated Dec. 20, 2011.

(Continued)

*Primary Examiner* — Timothy Thompson
*Assistant Examiner* — Amol Patel
(74) *Attorney, Agent, or Firm* — Bryan Cave LLP (57) ABSTRACT

Some embodiments include a device to facilitate moving an electrical cable of an electric vehicle charging station. Other embodiments of related systems and methods are also disclosed.

25 Claims, 5 Drawing Sheets

(56) References Cited

U.S. PATENT DOCUMENTS

| | | | |
|---|---|---|---|
| 5,548,200 A | 8/1996 | Nor et al. | |
| 5,594,318 A | 1/1997 | Nor et al. | |
| 5,705,910 A | 1/1998 | Kito et al. | |
| 6,029,072 A | 2/2000 | Barber | |
| 6,225,153 B1 * | 5/2001 | Neblett et al. | 438/188 |
| 6,373,380 B1 | 4/2002 | Robertson et al. | |
| 6,471,268 B1 * | 10/2002 | Stenstrom et al. | 294/15 |
| 6,725,104 B2 | 4/2004 | Lo et al. | |
| 7,045,989 B2 | 5/2006 | Sakakibara et al. | |
| 7,116,079 B2 | 10/2006 | Bayne et al. | |
| 7,135,836 B2 | 11/2006 | Kutkut et al. | |
| 7,196,494 B2 | 3/2007 | Baumgartner | |
| 7,253,586 B2 | 8/2007 | Kangas et al. | |
| 7,274,975 B2 | 9/2007 | Miller | |
| 7,358,701 B2 | 4/2008 | Field et al. | |
| 7,376,631 B2 | 5/2008 | King et al. | |
| 7,405,660 B2 | 7/2008 | Diorio et al. | |
| 7,444,192 B2 | 10/2008 | Dickinson et al. | |
| 7,546,214 B2 | 6/2009 | Rivers, Jr. et al. | |
| 7,590,472 B2 | 9/2009 | Hakim et al. | |
| 7,595,607 B2 | 9/2009 | Lambert et al. | |
| 7,622,897 B2 | 11/2009 | Eberhard et al. | |
| 7,629,772 B2 | 12/2009 | Eberhard et al. | |
| 7,629,773 B2 | 12/2009 | Eberhard et al. | |
| 7,671,567 B2 | 3/2010 | Eberhard et al. | |
| 7,679,336 B2 | 3/2010 | Gale et al. | |
| 7,688,022 B2 | 3/2010 | Alvarez-Troncoso et al. | |
| 7,698,078 B2 | 4/2010 | Kelty et al. | |
| 7,719,232 B2 | 5/2010 | Kelty et al. | |
| 7,747,739 B2 | 6/2010 | Bridges et al. | |
| 7,756,507 B2 | 7/2010 | Morper | |
| 7,782,021 B2 | 8/2010 | Kelty et al. | |
| 7,783,390 B2 | 8/2010 | Miller | |
| 7,786,704 B2 | 8/2010 | Kelty et al. | |
| 7,804,274 B2 | 9/2010 | Baxter et al. | |
| 7,844,370 B2 | 11/2010 | Pollack et al. | |
| 7,886,166 B2 | 2/2011 | Shnekendorf et al. | |
| 7,906,937 B2 | 3/2011 | Bhade et al. | |
| 7,917,251 B2 | 3/2011 | Kressner et al. | |
| 7,949,435 B2 | 5/2011 | Pollack et al. | |
| 7,952,319 B2 | 5/2011 | Lowenthal et al. | |
| 7,952,325 B2 | 5/2011 | Baxter et al. | |
| 7,956,570 B2 | 6/2011 | Lowenthal et al. | |
| 7,957,846 B2 | 6/2011 | Hakim et al. | |
| 7,972,167 B2 * | 7/2011 | Amit et al. | 439/456 |
| 2006/0089844 A1 | 4/2006 | Dickinson et al. | |
| 2006/0158037 A1 | 7/2006 | Danley et al. | |
| 2006/0276938 A1 | 12/2006 | Miller | |
| 2007/0203860 A1 | 8/2007 | Golden et al. | |
| 2007/0271006 A1 | 11/2007 | Golden et al. | |
| 2007/0276547 A1 | 11/2007 | Miller | |
| 2008/0039979 A1 | 2/2008 | Bridges et al. | |
| 2008/0039980 A1 | 2/2008 | Pollack et al. | |
| 2008/0039989 A1 | 2/2008 | Pollack et al. | |
| 2008/0040223 A1 | 2/2008 | Bridges et al. | |
| 2008/0040263 A1 | 2/2008 | Pollack et al. | |
| 2008/0040295 A1 | 2/2008 | Kaplan et al. | |
| 2008/0040296 A1 | 2/2008 | Bridges et al. | |
| 2008/0040479 A1 | 2/2008 | Bridges et al. | |
| 2008/0052145 A1 | 2/2008 | Kaplan et al. | |
| 2008/0114499 A1 | 5/2008 | Hakim et al. | |
| 2008/0136371 A1 | 6/2008 | Sutardja | |
| 2008/0167756 A1 | 7/2008 | Golden et al. | |
| 2008/0203973 A1 | 8/2008 | Gale et al. | |
| 2008/0228533 A1 | 9/2008 | McGuire et al. | |
| 2008/0249965 A1 | 10/2008 | Pollack et al. | |
| 2008/0281663 A1 | 11/2008 | Hakim et al. | |
| 2008/0312782 A1 | 12/2008 | Berdichevsky et al. | |
| 2009/0018706 A1 | 1/2009 | Wittner | |
| 2009/0024232 A1 | 1/2009 | Dickinson et al. | |
| 2009/0024255 A1 | 1/2009 | Penzenstadler et al. | |
| 2009/0024545 A1 | 1/2009 | Golden et al. | |
| 2009/0030712 A1 | 1/2009 | Bogolea et al. | |
| 2009/0040029 A1 | 2/2009 | Bridges et al. | |
| 2009/0043519 A1 | 2/2009 | Bridges et al. | |
| 2009/0043520 A1 | 2/2009 | Pollack et al. | |
| 2009/0063680 A1 | 3/2009 | Bridges et al. | |
| 2009/0066287 A1 | 3/2009 | Pollack et al. | |
| 2009/0077397 A1 | 3/2009 | Schnekendorf et al. | |
| 2009/0082957 A1 | 3/2009 | Agassi et al. | |
| 2009/0088907 A1 | 4/2009 | Lewis et al. | |
| 2009/0091291 A1 | 4/2009 | Woody et al. | |
| 2009/0140698 A1 | 6/2009 | Eberhard et al. | |
| 2009/0177580 A1 | 7/2009 | Lowenthal et al. | |
| 2009/0200988 A1 | 8/2009 | Bridges et al. | |
| 2009/0210357 A1 | 8/2009 | Pudar et al. | |
| 2009/0228388 A1 | 9/2009 | Axelrod et al. | |
| 2009/0259603 A1 | 10/2009 | Housh et al. | |
| 2009/0313098 A1 | 12/2009 | Hafner et al. | |
| 2009/0326729 A1 | 12/2009 | Hakim et al. | |
| 2010/0006356 A1 | 1/2010 | Curry et al. | |
| 2010/0094496 A1 | 4/2010 | Hershkovitz et al. | |
| 2010/0100342 A1 | 4/2010 | Kressner et al. | |
| 2010/0134067 A1 | 6/2010 | Baxter et al. | |
| 2010/0138178 A1 | 6/2010 | Paryani et al. | |
| 2010/0161517 A1 | 6/2010 | Littrell | |
| 2010/0161518 A1 | 6/2010 | Littrell | |
| 2010/0164439 A1 | 7/2010 | Ido | |
| 2010/0188043 A1 | 7/2010 | Kelty et al. | |
| 2010/0207588 A1 | 8/2010 | Lowenthal et al. | |
| 2010/0211340 A1 | 8/2010 | Lowenthal et al. | |
| 2010/0211643 A1 | 8/2010 | Lowenthal et al. | |
| 2010/0238596 A1 | 9/2010 | Wittner | |
| 2010/0259213 A1 | 10/2010 | Maharaj | |
| 2010/0289451 A1 | 11/2010 | Tuffner et al. | |
| 2010/0295508 A1 | 11/2010 | Mueller et al. | |
| 2010/0301809 A1 | 12/2010 | Bhade et al. | |
| 2010/0315089 A1 | 12/2010 | Rapich | |
| 2010/0315197 A1 | 12/2010 | Solomon et al. | |
| 2010/0332076 A1 | 12/2010 | Dickinson et al. | |
| 2010/0332373 A1 | 12/2010 | Crabtree et al. | |
| 2011/0001356 A1 | 1/2011 | Pollack | |
| 2011/0004358 A1 | 1/2011 | Pollack et al. | |
| 2011/0004406 A1 | 1/2011 | Davis | |
| 2011/0007824 A1 | 1/2011 | Bridges et al. | |
| 2011/0010043 A1 | 1/2011 | Lafky | |
| 2011/0010158 A1 | 1/2011 | Bridges | |
| 2011/0015799 A1 | 1/2011 | Pollack et al. | |
| 2011/0016063 A1 | 1/2011 | Pollack et al. | |
| 2011/0025556 A1 | 2/2011 | Bridges et al. | |
| 2011/0029144 A1 | 2/2011 | Muller et al. | |
| 2011/0029146 A1 | 2/2011 | Muller et al. | |
| 2011/0029157 A1 | 2/2011 | Muzaffer | |
| 2011/0037429 A1 | 2/2011 | DeBoer et al. | |
| 2011/0043163 A1 | 2/2011 | Baarman | |
| 2011/0050168 A1 | 3/2011 | Yoo et al. | |
| 2011/0055037 A1 | 3/2011 | Hayashigawa et al. | |
| 2011/0061014 A1 | 3/2011 | Frader-Thompson et al. | |
| 2011/0071932 A1 | 3/2011 | Agassi et al. | |
| 2011/0072112 A1 | 3/2011 | Kaplan | |
| 2011/0095723 A1 | 4/2011 | Bhade et al. | |
| 2011/0106327 A1 | 5/2011 | Zhou et al. | |
| 2011/0106328 A1 | 5/2011 | Zhou et al. | |
| 2011/0106329 A1 | 5/2011 | Donnelly et al. | |
| 2011/0121791 A1 | 5/2011 | Basham et al. | |
| 2011/0169447 A1 | 7/2011 | Brown et al. | |
| 2011/0202195 A1 | 8/2011 | Finch et al. | |

FOREIGN PATENT DOCUMENTS

| | | | |
|---|---|---|---|
| EP | 1458039 A3 | 2/2010 | |
| EP | 2199143 A1 | 6/2010 | |
| JP | 06-290836 A | 10/1994 | |
| JP | 06290836 A * | 10/1994 | |
| JP | 07-037644 A | 2/1995 | |
| JP | 10-117405 A | 5/1998 | |
| JP | 11-503599 A | 3/1999 | |
| JP | 3263075 B2 | 3/2002 | |
| JP | 2004-096973 A | 3/2004 | |
| JP | 2006-074868 A | 3/2006 | |
| JP | 2006-178259 A | 7/2006 | |
| JP | 2006-287705 A | 10/2006 | |
| JP | 2007-006573 | 1/2007 | |
| JP | 2008-083022 A | 4/2008 | |

(56) References Cited

FOREIGN PATENT DOCUMENTS

| JP | 2009-141991 A | 6/2009 |
|---|---|---|
| JP | 2010-098793 | 4/2010 |
| JP | 2010-110044 A | 5/2010 |
| JP | 2010-114988 A | 5/2010 |
| KR | 10-0460879 B1 | 12/2004 |
| KR | 10-0824073 B1 | 4/2008 |
| KR | 10-2009-125560 A | 12/2009 |
| KR | 2010-0035152 A | 4/2010 |
| WO | 2010-047902 | 4/2010 |
| WO | 2010/060370 A1 | 6/2010 |
| WO | 2010120551 A1 | 10/2010 |
| WO | 2010132495 A2 | 11/2010 |
| WO | 2011/032104 A1 | 3/2011 |

OTHER PUBLICATIONS

International Search Report and Written Opinion for corresponding Int'l Application No. PCT/US2011/037588 dated Feb. 9, 2012.
International Search Report and Written Opinion for corresponding Int'l Application No. PCT/US2011/037587 dated Dec. 16, 2011.
International Search Report and Written Opinion for corresponding Int'l Application No. PCT/US2011/034667 dated Feb. 8, 2012.
International Search Report and Written Opinion for corresponding Int'l Application No. PCT/US2012/030000 dated Jul. 2, 2012.
International Search Report and Written Opinion for corresponding Int'l Application No. PCT/US2012/029995 dated Jun. 12, 2012.
International Search Report and Written Opinion for corresponding Int'l Application No. PCT/US2012/029999 dated Oct. 12, 2012.

* cited by examiner

┌─────────────────────────────────────────────────┐
│ Wrapping the receiver assembly around at least part of the │ ～ 501
│ electrical cable outer surface of the electrical cable │
└─────────────────────────────────────────────────┘
                        ↓
┌─────────────────────────────────────────────────┐
│ Coupling at least one male pressure fitting at the first │
│ portion of the receiver assembly to at least one female │ ～ 502
│ pressure fitting at the second portion of the receiver │
│ assembly │
└─────────────────────────────────────────────────┘

DEVICE TO FACILITATE MOVING AN ELECTRICAL CABLE OF AN ELECTRIC VEHICLE CHARGING STATION AND METHOD OF PROVIDING THE SAME

CROSS-REFERENCE TO RELATED APPLICATIONS

This application is a continuation of International Patent Application Serial No. PCT/US12/30000, filed Mar. 21, 2012, which application claims the benefit of U.S. Provisional Patent Application Ser. No. 61/489,187, filed May 23, 2011. This application is also a continuation-in-part of International Patent Application Serial No. PCT/US2011/037587, filed May 23, 2011. International Patent Application Serial No. PCT/US2011/037587 claims the benefit of: (1) U.S. Provisional Application Ser. No. 61/367,316, filed Jul. 23, 2010; (2) U.S. Provisional Application Ser. No. 61/367,321, filed Jul. 23, 2010; (3) U.S. Provisional Application Ser. No. 61/367,337, filed Jul. 23, 2010; and (4) U.S. Provisional Application Ser. No. 61/367,317, filed Jul. 23, 2010. Further, International Patent Application Serial No. PCT/US2011/037587 is a continuation-in-part of International Patent Application Serial No. PCT/US2011/034667, filed Apr. 29, 2011. Meanwhile, International Patent Application Serial No. PCT/US2011/034667 claims the benefit of: (1) U.S. Provisional Application Ser. No. 61/367,316; (2) U.S. Provisional Application Ser. No. 61/367,321; (3) U.S. Provisional Application Ser. No. 61/367,337; and (4) U.S. Provisional Application No. 61/367,317.

International Patent Application Serial No. PCT/US12/30000, U.S. Provisional Patent Application Ser. No. 61/489,187, International Patent Application Serial No. PCT/US2011/037587, International Patent Application Serial No. PCT/US2011/034667, U.S. Provisional Application Ser. No. 61/367,316, U.S. Provisional Application Ser. No. 61/367,321, U.S. Provisional Application Ser. No. 61/367,337, and U.S. Provisional Application Ser. No. 61/367,317 are incorporated herein by reference in their entirety.

STATEMENT REGARDING FEDERALLY SPONSORED RESEARCH OR DEVELOPMENT

This invention was made with United States Government support under Contract No. DE-EE00002194 awarded by the Department of Energy. The United States Government has certain rights in this invention.

FIELD OF THE INVENTION

This invention relates generally to cables, and relates more particularly to devices that facilitate moving an electrical cable of an electric vehicle charging station and methods of providing the same.

DESCRIPTION OF THE BACKGROUND

Electrical cables for coupling electrical connectors of electric vehicle charging stations to electric vehicle charging stations can frequently be unwieldy and onerous to move as a result of the length, weight, and/or thickness of the electrical cables. Likewise, in operation, the electrical cables can frequently be run for distances along the ground adjacent to the electric vehicle charging station such that the electrical cables can be in jeopardy of being run over by other vehicles, can be in jeopardy of being tripped over by users of such vehicles, and/or can be undesirably exposed to anything present on the ground adjacent to the electric vehicle charging station.

Accordingly, a need or potential for benefit exists for devices and methods of providing such devices that facilitate moving an electrical cable of the electric vehicle charging station while protecting the electrical cables from being damaged.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include a device for an electrical cable, where the electrical cable is configured to couple an electrical connector with an electric vehicle charging station, and the electrical connector is configured to be coupled with an electric vehicle to permit the electric vehicle charging station to provide electricity to a rechargeable energy storage system of the electric vehicle. The device comprises a receiver assembly comprising a hollow space and configured to be coupled with the electrical cable. The device also comprises three or more gripping mechanisms coupled to the receiver assembly. In many embodiments, each one of the three or more gripping mechanisms is configured such that a user of the electric vehicle charging station can grasp at least one of the three or more gripping mechanisms to facilitate movement of the electrical cable when the electrical cable is located in the hollow space.

Various embodiments include a method of providing a device for an electrical cable, where the electrical cable is configured to couple an electrical connector with an electric vehicle charging station, and the electrical connector is configured to be coupled with an electric vehicle to permit the electric vehicle charging station to provide electricity to a rechargeable energy storage system of the electric vehicle. The method comprises: providing a receiver assembly configured to be coupled with the electrical cable; providing three or more gripping mechanisms configured such that a user of the electric vehicle charging station can grasp at least one of the three or more gripping mechanisms to facilitate movement of the electrical cable when the receiver assembly is coupled with the electrical cable; and coupling each one of the three or more gripping mechanisms with the receiver assembly.

Further embodiments include a device for an electrical cable, where the electrical cable is configured to couple an electrical connector with an electric vehicle charging station, and the electrical connector is configured to be coupled with an electric vehicle to permit the electric vehicle charging station to provide electricity to a rechargeable energy storage system of the electric vehicle. The device comprises a tubular portion configured to be coupled with the electrical cable and three handles coupled to the tubular portion. In many embodiments, each one of the three handles is configured such that a user of the electric vehicle charging station can grasp at least one of the three handles to facilitate movement of the electrical cable when the electrical cable is located within at least a portion of the tubular portion such that the tubular portion is wrapped around the electrical cable. The three handles can extend radially outward from the tubular portion, and each of the three handles are substantially identical to each other. The three handles can comprise a bright color and can be spaced substantially evenly around an outer perimeter of the tubular portion. Each of the three handles comprise an opening sized to fit at least four fingers of a hand of the user.

Figure 1:
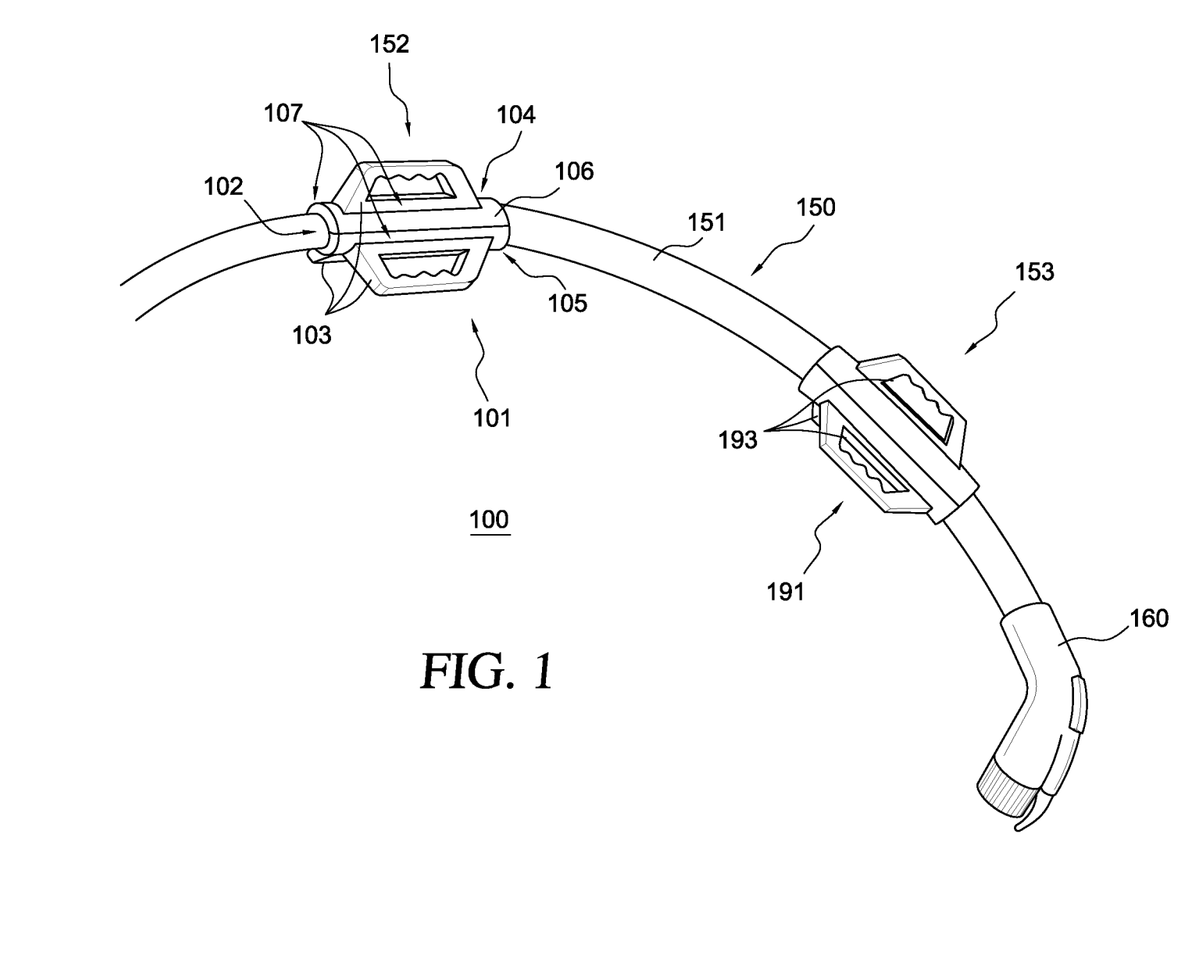
FIG. 1 illustrates devices for an electrical cable, according to a first embodiment.

Turning to the drawings, FIG. 1 illustrates an embodiment of device 100 for electrical cable 150, where electrical cable 150 is configured to couple electrical connector 160 with an electric vehicle charging station and where electrical connector 160 is configured to be coupled with an electric vehicle to permit the electric vehicle charging station to provide electricity to a rechargeable energy storage system of the electric vehicle. Device 100 is merely exemplary and is not limited to the embodiments presented herein. Device 100 can be employed in many different embodiments or examples not specifically depicted or described herein.

Device 100 comprises receiver assembly 101 comprising hollow space 102. Device 100 and/or receiver assembly 101 can be configured to be coupled with electrical cable 150. For example, device 100 and/or receiver assembly 101 can be configured to be coupled with electrical cable 150 at hollow space 102. Device 100 and/or receiver assembly 101 can comprise both open and closed configurations. In other embodiments, device 100 and/or receiver assembly 101 can be part of electrical cable 150. In some embodiments, receiver assembly 101 can be referred to as a tubular portion.

Electrical cable 150 comprises electrical cable outer surface 151. Receiver assembly 101 can be configured to be coupled with electrical cable 150 at a first cable location 152. Receiver assembly 101 can be configured to be coupled with electrical cable 150 by wrapping receiver assembly 101 around at least part of electrical cable outer surface 151. In other embodiments, receiver assembly 101 can be configured to receive an end of electrical cable 150 and to slide along electrical cable 150 (e.g., when the end of electrical cable 150 is not yet coupled to, or has been decoupled from, electrical connector 160 and/or the electric vehicle charging station) to first cable location 152 to couple with electrical cable 150. In various embodiments, receiver assembly 101 can comprise multiple pieces configured to couple to each other in order to couple around at least part of electrical cable outer surface 151 at the first cable location 152. For example, in some embodiments, receiver assembly 101 and/or the multiple pieces of receiver assembly 101 can comprise first piece 104 and second piece 105 opposite first piece 104. First piece 104 can be configured to be coupled with second piece 105, and/or vice versa.

In some embodiments, receiver assembly 101 and/or first piece 104 can comprise at least one male pressure fitting, and receiver assembly 101 and/or second piece 105 can comprise at least one female pressure fitting configured to receive the at least one male pressure fitting, or vice versa. The at least one male pressure fitting can be configured to be coupled to the at least one female pressure fitting when receiver assembly 101 is coupled with electrical cable 150 by wrapping receiver assembly 101 around at least part of electrical cable outer surface 151. Receiver assembly 101 can comprise at least one latching or clasping mechanism configured to couple receiver assembly 101 to itself and/or to couple one or more pieces of receiver assembly 101 together when receiver assembly 101 is coupled with electrical cable 150 by wrapping receiver assembly 101 around at least part of electrical cable outer surface 151. In some embodiments, receiver assembly 101 can comprise at least one hinge coupling one or more of the multiple pieces of receiver assembly 101 together (e.g., first piece 104 and second piece 105).

For example, when receiver assembly 101 comprises first piece 104 and second piece 105, first piece 104 and second piece 105 can be coupled together at one side by one or more hinges to permit first piece 104 and second piece 105 to pivot at the hinge to wrap around electrical cable outer surface 151. In this embodiment, first piece 104 and second piece 105 can be coupled at the other side by the one or more pressure fittings and/or the one or more latching or clasping mechanisms. In other embodiments, the one or more hinges can be replaced with one or more additional pressure fittings (e.g., such that first piece 104 and second piece 105 snap together at both sides) and/or one or more latching/clasping mechanisms to couple together the opposite side of first piece 104 and second piece 105.

In other embodiments, receiver assembly 101 can be configured to be coupled with electrical cable 150 by one or more external fasteners (e.g., tie-wraps, screw clamps, etc.). The one or more external fasteners can be applied to receiver assembly outer surface 106, as described below, to couple receiver assembly 101 to electrical cable 150. In some embodiments, the one or more external fasteners can be implemented in combination with one of the other manners of coupling describe above to further secure receiver assembly 101 to electrical cable 150.

Meanwhile, receiver assembly 101 can comprise receiver assembly outer surface 106 and/or a receiver assembly inner surface opposite to receiver assembly outer surface 106. The receiver assembly inner surface can comprise a liner covering at least part of the receiver assembly inner surface. The liner can comprise a material having a coefficient of friction sufficient to inhibit and/or prevent movement (e.g., shifting) of receiver assembly 101 along electrical cable 150 when receiver assembly 101 is coupled with electrical cable 150.

In many embodiments, receiver assembly outer surface 106 can comprise a receiver assembly outer cross-section and/or the receiver assembly inner surface can comprise a receiver assembly inner cross-section. The combination of the receiver assembly outer cross-section and the receiver assembly inner cross-section form a cross-section of receiver assembly 101. Receiver assembly 101, the receiver assembly outer cross-section, and/or the receiver assembly inner cross-section can comprise a tubular shape and/or a circular cross-section. In various embodiments, receiver assembly outer cross-section and/or receiver assembly inner cross-section can comprise any of various other shapes (e.g., a triangle, a square, or other multi-sided polygon, etc.). The receiver assembly outer cross-section and the receiver assembly inner cross-section can comprise the same shape, but can also be different shapes. In many embodiments, the receiver assembly inner cross-section can be the same shape as electrical cable outer surface 151 and/or electrical cable 150.

Receiver assembly 101 can have a length of approximately 6 inches (15.2 centimeters) to approximately 12 inches (30.5 centimeters) with respect to a longitudinal dimension of electrical cable 150. Receiver assembly 101 can have a width larger than circumference, perimeter, or diameter of electrical cable outer surface 151 and/or electrical cable 150.

Receiver assembly 101 can comprise plastic (e.g., polycarbonate, polyurethane, and/or acrylonitrile butadiene styrene, etc.) and/or metal (aluminum, stainless steel, etc.). The plastic and/or metal can be rigid. In many embodiments, receiver assembly 101 can be covered in plastic and/or rubber. In some embodiments, the liner of the receiver assembly inner surface can comprise the plastic and/or rubber covering receiver assembly 101, or the liner can be separate and/or over the covering.

Device 100 also comprises one or more gripping mechanisms 103 (e.g., three gripping mechanisms) coupled to receiver assembly 101. Where gripping mechanism(s) 103 comprise multiple gripping mechanisms, each of gripping mechanisms 103 can be similar or identical to each other. In other embodiments, where gripping mechanism(s) 103 comprise multiple gripping mechanisms, one or more of gripping mechanisms 103 can differ from at least another one of gripping mechanisms 103. In some embodiments, gripping mechanisms 103 can be referred to as one or more handles (e.g., three handles).

In some embodiments, when receiver assembly 101 comprises two pieces (e.g., first piece 104 and second piece 105) and gripping mechanism(s) 103 comprise multiple gripping mechanisms, the first piece (e.g., first piece 104) can comprise one of gripping mechanisms 103, and the second piece (e.g., second piece 105) can comprise one or more (e.g. two) of gripping mechanisms 103, or vice versa. In other embodiments, when receiver assembly 101 comprises three pieces and when device 100 comprises three of gripping mechanism(s) 103, each of the three pieces can comprise a single one of the three of gripping mechanisms 103. In three embodiments, the first and second pieces of receiver assembly 101 can be hingedly coupled together, and the second and third pieces of receiver assembly 101 can be hingedly coupled together.

In the same or different embodiments, receiver assembly 101 and/or the three or more gripping mechanisms 103 can be molded, cast, or forged. When receiver assembly 101 comprises multiple pieces, each of the multiple pieces of receiver assembly 101 and/or the corresponding three or more gripping mechanisms 103 can be molded, cast, or forged.

In other embodiments, receiver assembly outer surface 106 can comprise one or more receptacles 107 (e.g., three receptacles). In various embodiments, a first quantity of receptacle(s) 107 can be equal to a second quantity of gripping mechanism(s) 103. In the same or different embodiments, each one of receptacle(s) 107 can be configured to receive any one of gripping mechanism(s) 103 (i.e., gripping mechanism(s) 103 are attachable/detachable from receiver assembly 101).

In some embodiments, receptacle(s) 107 can comprise one or more channels configured such that each one of gripping mechanism(s) 103 can be slid into a different one of the one or more channels. In other embodiments, receptacle(s) 107 can comprise threading such that each one of gripping mechanism(s) 103 can be screwed into one of receptacle(s) 107. In further embodiments, gripping mechanism(s) 103 can be integral to receiver assembly 101 such that at least one of gripping mechanism(s) 103 and one piece of receiver assembly 101 form a single piece.

Gripping mechanism(s) 103 can extend radially outward from receiver assembly 101 and/or electrical cable 150. In some embodiments, gripping mechanism(s) 103 can extend radially outward from receiver assembly 101 and/or receiver assembly outer surface 106 between approximately 3 inches (7.5 centimeters) and approximately 6 inches (15.2 centimeters).

Gripping mechanism(s) 103 can have lengths of approximately 6 inches (15.2 centimeters) to approximately 12 inches (30.5 centimeters) with respect to a longitudinal dimension of electrical cable 150. Gripping mechanism(s) 103 can have widths of approximately 0.5 inches (1.2 centimeters) to approximately 1 inch (4.1 centimeters) with respect to a lateral dimension (e.g., circumference, perimeter, diameter, etc.) of electrical cable 150.

Each one of gripping mechanism(s) 103 can comprise plastic (e.g., polycarbonate, polyurethane, and/or acrylonitrile butadiene styrene, etc.) and/or metal (aluminum, stainless steel, etc.). The plastic and/or metal can be rigid. In many embodiments, gripping mechanism(s) 103 can be covered in plastic and/or rubber. In some embodiments, the liner of the receiver assembly inner surface can comprise the plastic and/or rubber covering gripping mechanism(s) 103, or the liner can be separate and/or over the covering.

Each one of gripping mechanism(s) 103 can be configured such that a user of the electric vehicle charging station can grasp at least one of gripping mechanism(s) 103 to facilitate movement of electrical cable 150 when electrical cable 150 is located in hollow space 102. Gripping mechanism(s) 103 can each comprise an opening sized at least to fit four fingers and/or a palm of a human hand. In some embodiments, at least part of the opening of one or more of gripping mechanism(s) 103 can be molded to conform to a shape of the four fingers and/or the palm of the human hand.

In some embodiments, gripping mechanism(s) 103 can be configured to prevent electrical connector 160 from contacting the ground when at least one (e.g., one, two, three, etc.) of gripping mechanism(s) 103 contacts the ground and when the electrical cable is located in hollow space 102.

In the same or different embodiments, device 100 and/or gripping mechanism(s) 103 can absorb at least part of an impact to electrical cable 150 and/or electrical connector 160 to prevent or reduce damage inflicted on electrical cable 150 and/or electrical connector 160 as a result of the impact. For example, the impact could be the result of the user dropping electrical cable 150 and/or electrical connector 160. In other examples, the impact could be the result of the electric vehicle or any other vehicle driving over the electrical cable 150 and/or electrical connector 160. In some embodiments, device 100 and/or gripping mechanism(s) 103 can be configured with one or more crumple zones, similar to the crumple zones in an automobile chassis, to absorb the impact. In the same or different embodiments, device 100 and/or gripping mechanism(s) 103 can inherently absorb the impact where device 100 and/or gripping mechanism(s) 103 comprise a rigid and/or strong material.

In some embodiments, device 100, receiver assembly 101, and/or at least one of gripping mechanism(s) 103 can comprise a bright color. The bright color can comprise yellow, orange, red, green, blue, purple, etc., or any fluorescent color When receiver assembly 101 and/or at least one of gripping mechanism(s) 103 comprise the bright color, visibility of the electrical cable can be improved. Accordingly, the increased visibility can prevent electrical cable 150 from being driven over by a vehicle or tripped over by a user of the vehicle.

In some embodiments, receiver assembly 101 and/or at least one of gripping mechanism(s) 103 can be configured to be mounted on the electric vehicle charging station to aid in storing electrical cable 150 and/or electrical connector 160 of the electric vehicle charging station. In further embodiments, receiver assembly 101 (and where applicable, one or more additional receiver assemblies (e.g., receiver assembly 191, as described below) can be configured to be mounted to and/or stored at a drum-like reel of the electric vehicle charging station, the reel being configured to receive and to store electrical cable 150, when the reel has received and is storing electrical cable 150 and receiver assembly 101 (and any additional receiver assemblies, as applicable) is coupled to electrical cable 150. For example, electrical cable 150 can be spooled around the reel for purposes of storage and/or to keep all or part of electrical cable 150 organized.

In some embodiments, the reel can comprise at least one receiver assembly receptacle, each receiver assembly receptacle of the at least one receiver assembly receptacle being configured to receive a different one of the one or more receiver assemblies (e.g., receiver assembly 101, receiver assembly 191, etc.) of device 100 when the reel is storing electrical cable 150. A quantity of the at least one receiver assembly can be equal to a quantity of the one or more receiver assemblies. Meanwhile, in some embodiments, the at least one receiver assembly receptacle can be located and/or positioned at the top of the reel. Where device 100 comprises multiple receiver assemblies, each of the multiple receiver assemblies can be equally spaced apart along electrical cable 150 when coupled to electrical cable 150, as described in further detail below. Accordingly, each of the multiple receiver assemblies can be indexed into its respective receiver assembly receptacle such that each coil or loop of electrical cable 150 is spooled around the reel in approximately equal lengths. Thus, it can also be made clear to the user of device 100 where each receiver assembly of the multiple receiver assemblies is to be stored. In another embodiment, each of the multiple receiver assemblies can be spaced progressively further apart (or closer together) along electrical cable 150 depending on the configuration of the at least one receiver assembly receptacle. For example, if the at least one receiver assembly receptacle comprises multiple receiver assembly receptacles and the receiver assembly receptacles are positioned at different distances from each other with respect to the reel, it may be desirable to space apart the multiple receiver assemblies accordingly, as described above.

In many embodiments, device 100 can comprise one or more additional receiver assemblies, where each one of the one or more additional receiver assemblies can comprise one or more (e.g., three) additional gripping mechanisms coupled to each one of the one or more additional receiver assemblies. The one or more additional receiver assemblies can be similar or identical to receiver assembly 101, and/or the additional gripping mechanism(s) can be similar or identical to gripping mechanism(s) 103.

For example, referring again to FIG. 1, in some embodiments, device 100 can comprise second receiver assembly 191 and one or more (e.g., three) second gripping mechanisms 193. When receiver assembly 101 is coupled with electrical cable 150 and when second receiver assembly 191 is coupled with electrical cable 150, receiver assembly 101 can be coupled with electrical cable 150 at first cable location 152 and second receiver assembly 191 can be coupled with electric cable 150 at second cable location 153 closer to electrical connector 160 than first cable location 152 along the longitudinal dimension of electrical cable 150. In some embodiments, receiver assembly 101 and/or first cable location 152 can be approximately 6 inches (15.2 centimeters) to approximately 24 inches (61 centimeters) apart from second receiver assembly 191 and/or second cable location 153.

Where device 100 comprises multiple receiver assemblies (e.g., receiver assembly 101, receiver assembly 191, etc.), each receiver assembly of the multiple assemblies may be coordinated with its respective receiver assembly receptacle, as described above, to indicate which receiver assembly is associated with that receiver assembly receptacle. For example, each receiver assembly may comprise a different color or some other indicator (e.g., a symbol, a number, a letter, etc.) and each receiver assembly receptacle may comprise a complimentary color or other indicator to that of its respective receiver assembly to clearly indicate which receiver assembly is associated with that receiver assembly receptacle.

Figure 2:
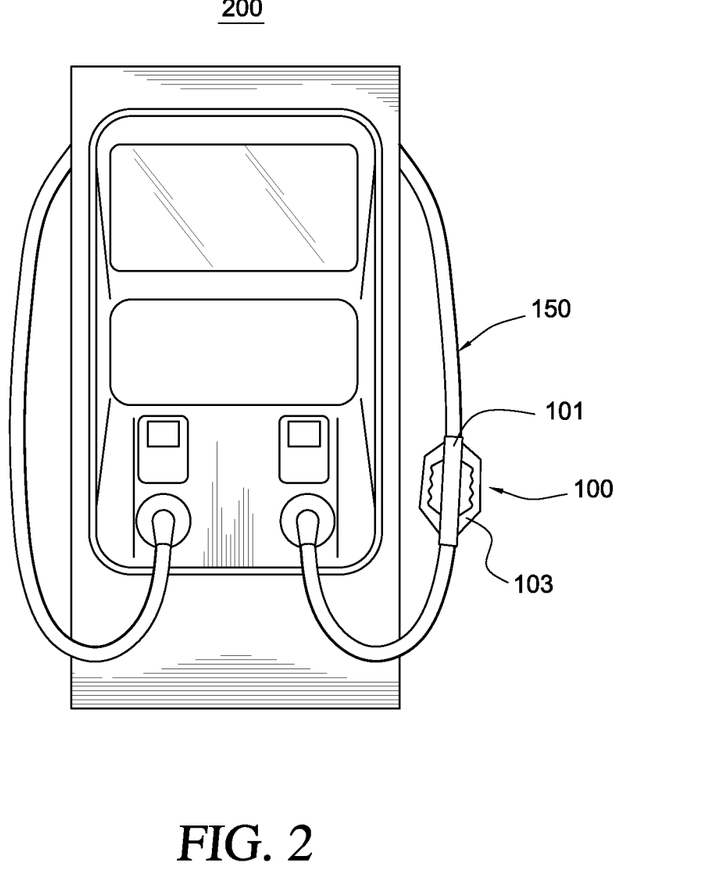
FIG. 2 illustrates an electric vehicle charging station with at least one device of the devices of FIG. 1, according to the first embodiment.
Figure 3:
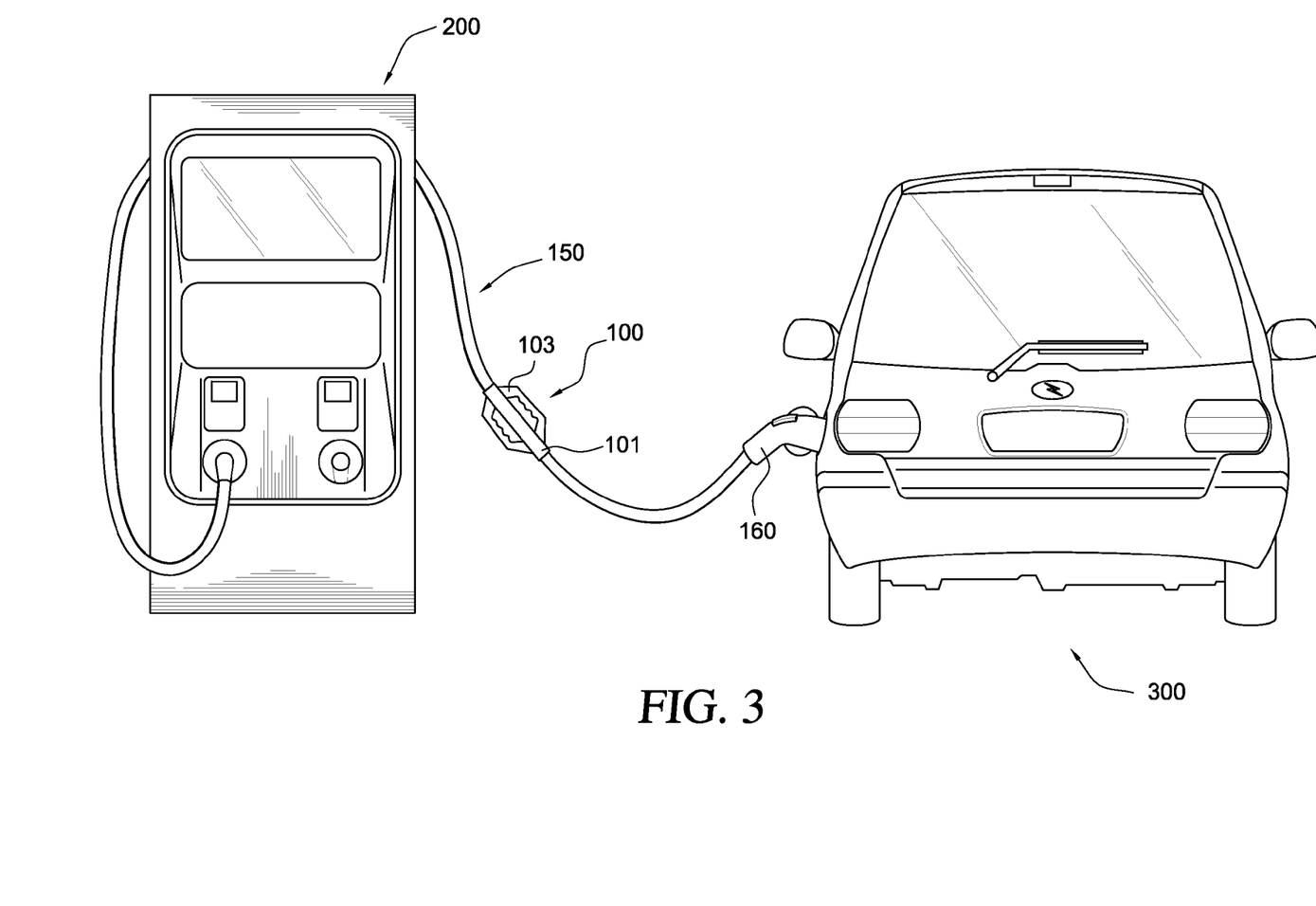
FIG. 3 illustrates the electric vehicle charging station of FIG. 2 charging an electric vehicle, according to the first embodiment.

Turning to the next drawing, FIG. 2 illustrates an exemplary embodiment of device 100 when a single one of device 100 and/or receiver assembly 101 are coupled to electrical cable 150 while electrical connector 160 and electrical cable 150 are in a stored position at electric vehicle charging station 200. Electric vehicle charging station 200 comprises electrical cable 150, device 100, and the electrical connector (not shown in FIG. 2). Meanwhile, FIG. 3 illustrates the exemplary embodiment of device 100 when device 100 and/or receiver assembly 101 are coupled to electrical cable 150 while electrical connector 160 is coupled with electric vehicle 300 and/or electric vehicle charging station 200 is providing electricity to the rechargeable energy storage system of the electric vehicle.

Figure 4:
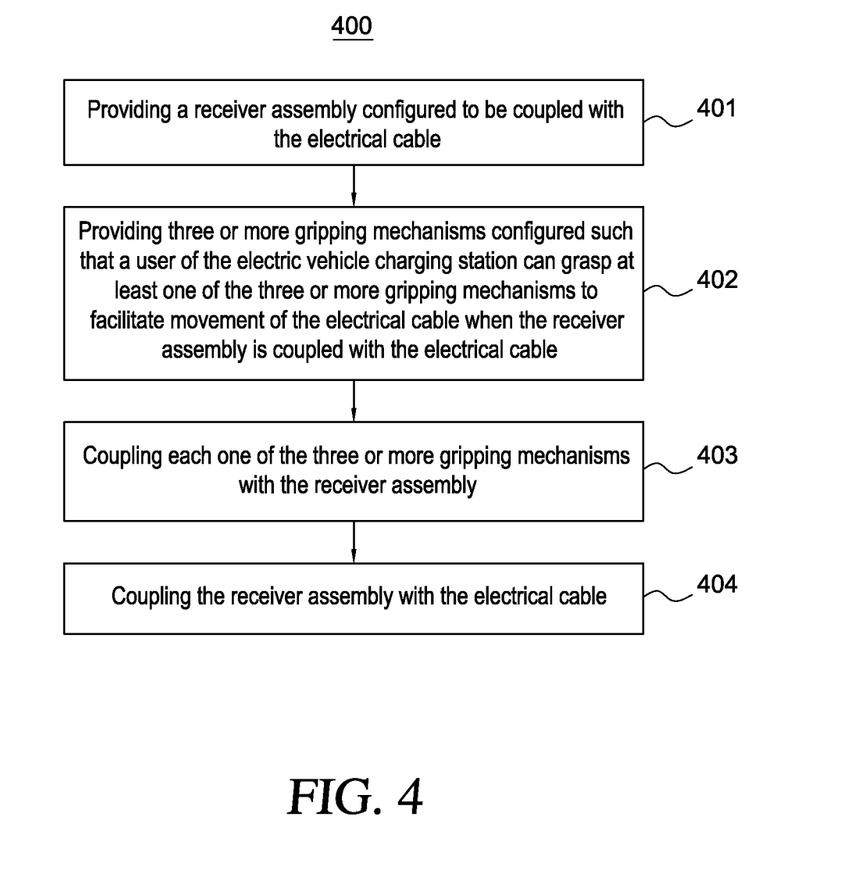
FIG. 4 is a flow chart illustrating an embodiment of a method of providing at least one device for an electric cable.

Turning once again in the drawings, FIG. 4 illustrates a flow chart for an embodiment of method 400 of providing a device for an electrical cable, where the electrical cable is configured to couple an electrical connector with an electric vehicle charging station and the electrical connector is configured to be coupled with an electric vehicle to permit the electric vehicle charging station to provide electricity to a rechargeable energy storage system of the electric vehicle. The device can be similar or identical to device 100 (FIG. 1), and the electrical cable can be similar or identical to electrical cable 150. The electric vehicle charging station can be similar or identical to electric vehicle charging station 200 (FIG. 2), and the electric vehicle can be similar or identical to electric vehicle 300 (FIG. 3). Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of the method 400 can be performed in any other suitable order. In still other embodiments, one or more of the procedures, the processes, and/or the activities in method 400 can be combined or skipped.

Method 400 can comprise procedure 401 of providing a receiver assembly configured to be coupled with the electrical cable. The receiver assembly can be similar or identical to receiver assembly 101 (FIG. 1).

Method 400 can comprise procedure 402 of providing one or more gripping mechanisms configured such that a user of the electric vehicle charging station can grasp at least one of the gripping mechanism(s) to facilitate movement of the electrical cable when the receiver assembly is coupled with the electrical cable. In some embodiments, performing procedure 402 can comprise providing three or more gripping mechanisms. The gripping mechanism(s) can be similar or identical to gripping mechanism(s) 103 (FIG. 1).

In some embodiments, procedure 401 and procedure 402 can be performed and/or can occur simultaneously. For example, procedure 401 can comprise one of molding, forging, or casting the receiver assembly configured to be coupled with the electrical cable. Likewise, procedure 402 can comprise one of molding, forging, or casting the gripping mechanism(s). Accordingly, in the same or different embodiments, the receiver assembly and the gripping mechanism(s) can be molded, forged, or casted together simultaneously or at least part of the receiver assembly, and one or more of the gripping mechanism(s) can be molded, forged, or casted together, as described above with respect to device 100 (FIG. 1) when the receiver assembly comprises multiple pieces.

Method 400 can comprise procedure 403 of coupling each one of the gripping mechanism(s) (e.g., three gripping mechanisms) with the receiver assembly (e.g., where the receiver assembly and gripping mechanism(s) are separate pieces). Procedure 403 of coupling each one of the gripping mechanism(s) (e.g., three gripping mechanisms) with the receiver assembly (e.g., where the receiver assembly and gripping mechanism(s) are separate pieces). In some embodiments, procedure 403 can comprise coupling each one of the gripping mechanism(s) with a different one of one or more receptacles (e.g., three receptacles) of a receiver assembly outer surface of the receiver assembly. The receptacle(s) can be similar or identical to receptacle(s) 107 (FIG. 1), and/or the receiver assembly outer surface can be similar or identical to receiver assembly outer surface 151 (FIG. 1). In some embodiments, each one of the receptacle(s) can comprise a channel. In various embodiments, coupling each one of the gripping mechanism(s) with the different one of the receptacle(s) of the receiver assembly outer surface comprises sliding each one of the gripping mechanism(s) into the different one of each one of the receptacle(s). In a different embodiments, where the gripping mechanisms are integrated with the pieces of the receiver assembly, procedure 403 can be omitted.

Figure 5:
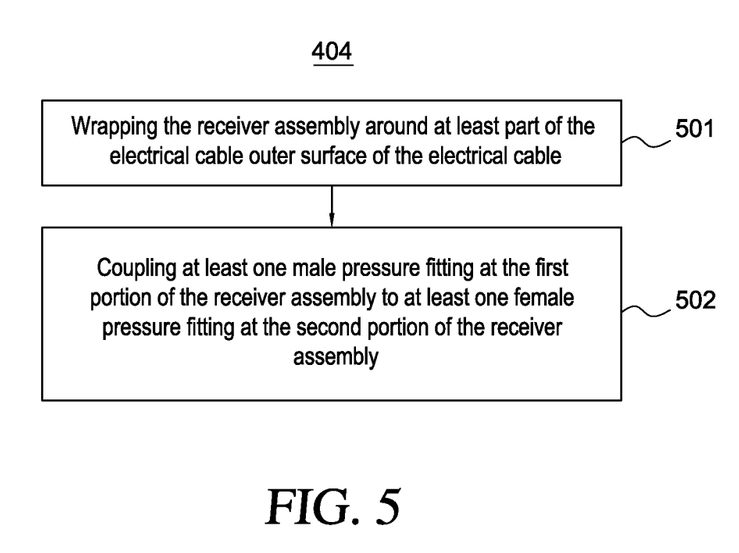
FIG. 5 is a flow chart illustrating an embodiment of coupling a receiver assembly with an electrical cable, according to the embodiment of FIG. 4.

Method 400 can comprise procedure 404 of coupling the receiver assembly with the electrical cable. Procedure 404 of coupling the receiver assembly with the electrical cable can be performed similarly or identically to any of the approaches described above with respect to device 100 (FIG. 1). FIG. 5 illustrates an exemplary embodiment of procedure 404, according to the embodiment of method 400.

Referring now to FIG. 5, procedure 404 can comprise process 501 of wrapping the receiver assembly around at least part of the electrical cable outer surface of the electrical cable. Procedure 400 can further comprise process 502 of coupling a first portion of the receiver assembly to a second portion of the receiver assembly opposite the first portion of the receiver assembly. In some embodiments, process 502 comprises coupling at least one male pressure fitting at the first portion of the receiver assembly to at least one female pressure fitting at the second portion of the receiver assembly, where the at least one female pressure fitting is configured to receive the at least one male pressure fitting.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that procedures 401-404 of FIG. 4 and processes 501-502 of FIG. 5 may be comprised of many different procedures, processes, and activities and be performed by many different modules, in many different orders, that any element of FIGS. 1-5 may be modified, and that the foregoing discussion of certain of these embodiments does not necessarily represent a complete description of all possible embodiments. As another example, device 100 can be used with cables that are not part of an electric vehicle charging station, with other types of electrical cables, and with other types of non-electrical cables.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A device for an electrical cable, the electrical cable being configured to couple an electrical connector with an electric vehicle charging station, the electrical connector being configured to be coupled with an electric vehicle to permit the electric vehicle charging station to provide electricity to a rechargeable energy storage system of the electric vehicle, the device comprising:
a receiver assembly comprising a hollow space and being configured to be coupled with the electrical cable; and
three or more gripping mechanisms coupled to the receiver assembly;
wherein:
each one of the three or more gripping mechanisms is configured such that a user of the electric vehicle charging station can grasp at least one of the three or more gripping mechanisms to facilitate movement of the electrical cable when the electrical cable is located in the hollow space.

2. The device of claim 1 wherein:
the three or more gripping mechanisms are configured to prevent the electrical connector from contacting a ground surface when at least one of the three or more gripping mechanisms is contacting the ground surface and when the electrical cable is located in the hollow space.

3. The device of claim 1 wherein:
the electrical cable comprises an electrical cable outer surface; and
the receiver assembly is configured to be coupled with the electrical cable by wrapping the receiver assembly around at least part of the electrical cable outer surface.

4. The device of claim 1 wherein:
the receiver assembly comprises a first piece and a second piece opposite the first piece; and
the first piece is configured to be coupled with the second piece.

5. The device of claim 4 wherein:
the first piece comprises at least one male pressure fitting;
the second piece comprises at least one female pressure fitting configured to receive the at least one male pressure fitting; and
the at least one male pressure fitting is configured to be coupled to the at least one female pressure fitting when the receiver assembly is coupled with the electrical cable by wrapping the receiver assembly around at least part of the electrical cable outer surface.

6. The device of claim 1 wherein at least one of:
the three or more gripping mechanisms extend radially outward from the receiver assembly and the electrical cable;
at least one of the three or more gripping mechanisms is configured to be mounted on the electric vehicle charging station;
the three or more gripping mechanisms are spaced substantially evenly around a perimeter of the receiver assembly;
the receiver assembly comprises a tubular shape and a circular cross-section;
each of the three or more gripping mechanisms are substantially identical to each other;
the three or more gripping mechanisms and the receiver assembly have lengths of approximately 15.2 centimeters to approximately 30.5 centimeters; or
the three or more gripping mechanisms comprises openings sized to fit at least four fingers of a human hand.

7. The device of claim 1 wherein:
the receiver assembly comprises a receiver assembly outer surface;
the receiver assembly outer surface comprises three or more receptacles;
a first quantity of the three or more receptacles equals a second quantity of the three or more gripping mechanisms; and
each one of the three or more receptacles is configured to receive any one of the three or more gripping mechanisms.

8. The device of claim 1 wherein:
at least one of: (a) the receiver assembly or (b) each one of the three or more gripping mechanisms, comprises at least one of plastic or metal.

9. The device of claim 1 wherein:
at least one of: (a) the receiver assembly or (b) at least one of the three or more gripping mechanisms, comprises a bright color to improve a visibility of the electrical cable.

10. The device of claim 1 further comprising:
a second receiver assembly comprising a second hollow space and configured to be coupled with the electrical cable; and
three or more second gripping mechanisms coupled to the second receiver assembly;
wherein:
each one of the three or more second gripping mechanisms is configured such that the user of the electric vehicle charging station can grasp at least one of the three or more second gripping mechanisms to facilitate movement of the electrical cable when the electrical cable is located in the second hollow space; and
when the receiver assembly is coupled with the electrical cable and when the second receiver assembly is coupled with the electrical cable, the receiver assembly is coupled with the electrical cable at a first cable location and the second receiver assembly is coupled with the electrical cable at a second cable location closer to the electrical connector than the first cable location.

11. The device of claim 10 wherein:
the receiver assembly is approximately 15.2 centimeters to approximately 61.0 centimeters apart from the second receiver assembly.

12. A method of providing a device for an electrical cable, the electrical cable being configured to couple an electrical connector with an electric vehicle charging station, the electrical connector being configured to be coupled with an electric vehicle to permit the electric vehicle charging station to provide electricity to a rechargeable energy storage system of the electric vehicle, the method comprising:
providing a receiver assembly configured to be coupled with the electrical cable;
providing three or more gripping mechanisms configured such that a user of the electric vehicle charging station can grasp at least one of the three or more gripping mechanisms to facilitate movement of the electrical cable when the receiver assembly is coupled with the electrical cable; and coupling each one of the three or more gripping mechanisms with the receiver assembly.

13. The method of claim 12 further comprising:
coupling the receiver assembly with the electrical cable.

14. The method of claim 13 wherein:
coupling the receiver assembly with the electrical cable comprises wrapping the receiver assembly around at least part of an electrical cable outer surface of the electrical cable.

15. The method of claim 12 wherein:
the three or more gripping mechanisms are configured to prevent the electrical connector from contacting a ground surface when the receiver assembly is coupled with the electrical cable and when at least one of the three or more gripping mechanisms is contacting the ground surface.

16. The method of claim 15 further comprising:
coupling the receiver assembly with the electrical cable by coupling a first portion of the receiver assembly to a second portion of the receiver assembly opposite the first portion of the receiver assembly.

17. The method of claim 16 wherein:
coupling the first portion of the receiver assembly to the second portion of the receiver assembly opposite the first portion of the receiver assembly comprises coupling at least one male pressure fitting at the first portion of the receiver assembly to at least one female pressure fitting at the second portion of the receiver assembly, the at least one female pressure fitting being configured to receive the at least one male pressure fitting.

18. The method of claim 12 wherein:
coupling each one of the three or more gripping mechanisms with the receiver assembly comprises coupling each one of the three or more gripping mechanisms with a different one of three or more receptacles of a receiver assembly outer surface of the receiver assembly, wherein a first quantity of the three or more receptacles equals a second quantity of the three or more gripping mechanisms.

19. The method of claim 18 wherein:
each one of the three or more receptacles comprises a channel; and
coupling each one of the three or more gripping mechanisms with the different one of the three or more receptacles of the receiver assembly outer surface of the receiver assembly comprises sliding each one of the three or more gripping mechanisms into the different one of the three or more receptacles.

20. The method of claim 12 wherein:
at least one of: (a) the receiver assembly or (b) each one of the three or more gripping mechanisms, comprises at least one of plastic or metal.

21. The method of claim 12 wherein:
at least one of: (a) the receiver assembly or (b) at least one of the three or more gripping mechanisms, comprises a bright color to improve a visibility of the electrical cable.

22. The method of claim 12 wherein:
at least one of the three or more gripping mechanisms is configured to be mounted on the electric vehicle charging station.

23. A device for an electrical cable, the electrical cable being configured to couple an electrical connector with an electric vehicle charging station, the electrical connector being configured to be coupled with an electric vehicle to permit the electric vehicle charging station to provide electricity to a rechargeable energy storage system of the electric vehicle, the device comprising:
a tubular portion configured to be coupled with the electrical cable; and
three handles coupled to the tubular portion;
wherein:
each one of the three handles is configured such that a user of the electric vehicle charging station can grasp at least one of the three handles to facilitate movement of the electrical cable when the electrical cable is located within at least a portion of the tubular portion such that the tubular portion is wrapped around the electrical cable;
the three handles extend radially outward from the tubular portion;
each of the three handles are substantially identical to each other;
the three handles comprise a bright color and are spaced substantially evenly around an outer perimeter of the tubular portion; and
each of the three handles comprise an opening sized to fit at least four fingers of a hand of the user.

24. The device of claim 23 wherein:
the three handles are configured to prevent the tubular portion and the electrical connector from contacting a ground surface when the tubular portion is coupled with the electrical cable and when at least one of the three handles is contacting the ground surface;
and
the tubular portion and each of the three handles comprise lengths of approximately 15.2 centimeters to approximately 30.5 centimeters.

25. The device of claim 23 wherein:
the tubular portion comprises a circular cross-section.

* * * * *